(12) United States Patent
Sugiura et al.

(10) Patent No.: US 10,810,461 B2
(45) Date of Patent: Oct. 20, 2020

(54) LEARNED MODEL GENERATING METHOD, LEARNED MODEL GENERATING DEVICE, AND LEARNED MODEL USE DEVICE

(71) Applicant: PANASONIC INTELLECTUAL PROPERTY MANAGEMENT CO., LTD., Osaka (JP)

(72) Inventors: Masataka Sugiura, Tokyo (JP); Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 16/097,968

(22) PCT Filed: Dec. 11, 2017

(86) PCT No.: PCT/JP2017/044295
§ 371 (c)(1),
(2) Date: Oct. 31, 2018

(87) PCT Pub. No.: WO2018/142764
PCT Pub. Date: Aug. 9, 2018

(65) Prior Publication Data
US 2019/0095757 A1    Mar. 28, 2019

(30) Foreign Application Priority Data
Feb. 3, 2017  (JP) .................... 2017-018293

(51) Int. Cl.
*G06K 9/62* (2006.01)
*G06K 9/00* (2006.01)
(Continued)

(52) U.S. Cl.
CPC ......... *G06K 9/6256* (2013.01); *G06F 16/583* (2019.01); *G06F 16/5838* (2019.01);
(Continued)

(58) Field of Classification Search
CPC ........... G06K 9/00288; G06K 9/00221; G06K 9/6256; G06K 9/6262; G06Q 10/04;
(Continued)

(56) References Cited

U.S. PATENT DOCUMENTS 9,147,128 B1 * 9/2015 Chafni ............... G06K 9/00288
9,672,370 B1 * 6/2017 Lewis ................ H04N 21/4532
(Continued)

FOREIGN PATENT DOCUMENTS

JP    2004-318391    11/2004
JP    2006-244301    9/2006
(Continued)

OTHER PUBLICATIONS

The Extended European Search Report dated Oct. 7, 2019 for the related European Patent Application No. 17895308.9.
(Continued)

*Primary Examiner* — Brandon J Miller
(74) *Attorney, Agent, or Firm* — Greenblum & Bernstein, P.L.C.

(57) ABSTRACT

Learned model providing system has a configuration including consent acquisition device that acquires use consent that an acquired image of visitor is to be used for generating a learned model from visitor, a plurality of cameras that image visitor, learned model generating device that generates the learned model by machine learning based on a captured image imaged by camera, server device that saves the learned model generated by learned model generating device, user side device that receives the learned model from server device, camera, and member database.

13 Claims, 12 Drawing Sheets

(51) Int. Cl.
*G06N 20/00* (2019.01)
*G06F 16/583* (2019.01)
*G06Q 10/04* (2012.01)
*G06F 21/60* (2013.01)
*G06F 21/62* (2013.01)
*G06Q 30/02* (2012.01)

(52) U.S. Cl.
CPC .......... *G06F 21/60* (2013.01); *G06F 21/6245* (2013.01); *G06K 9/00221* (2013.01); *G06K 9/00288* (2013.01); *G06K 9/6262* (2013.01); *G06N 20/00* (2019.01); *G06Q 10/04* (2013.01); *G06Q 30/0201* (2013.01)

(58) Field of Classification Search
CPC ... G06Q 30/0201; G06F 21/60; G06F 16/583; G06F 21/6245; G06F 61/5838; G06N 20/00; G06N 3/084
See application file for complete search history.

(56) References Cited

U.S. PATENT DOCUMENTS

| | | | |
|---|---|---|---|
| 9,704,020 | B2* | 7/2017 | Koul ................. G06K 9/00 |
| 10,062,133 | B1* | 8/2018 | Mishra ............... G06T 1/0007 |
| 2010/0281267 | A1 | 11/2010 | Sakumoto |
| 2012/0087556 | A1* | 4/2012 | Dai .................... G06K 9/0014 382/128 |
| 2014/0372561 | A1 | 12/2014 | Hisano |
| 2016/0210862 | A1 | 7/2016 | Hisano |
| 2017/0039495 | A1 | 2/2017 | Takehara et al. |
| 2017/0054895 | A1* | 2/2017 | Wan ................. H04N 5/23258 |
| 2017/0076142 | A1* | 3/2017 | Chang ................. G06T 7/90 |

FOREIGN PATENT DOCUMENTS

| | | |
|---|---|---|
| JP | 2010-278482 | 12/2010 |
| JP | 5445722 | 1/2014 |
| JP | 2015-220574 | 12/2015 |
| JP | 2016-053869 | 4/2016 |
| JP | 2016-126597 | 7/2016 |
| WO | 2016/205432 A1 | 12/2016 |

OTHER PUBLICATIONS

"'Metadata Incorporated', a venture established by leaders in AI research, to sell artificial intelligence that has been taught," Dream Gate Bureau, https://web.archive.org/web/20161120124912/http://www.dreamgate.gr.jp/news/4183, p. 1, 1.5, Nov. 20, 2016, together with an English language translation thereof.

International Search Report issued in International Patent Application No. PCT/JP2017/044295, dated Febmary 27, 2018.

U.S. Appl. No. 16/097,998 to Yuichi Matsumoto et al., filed Oct. 31, 2018.

U.S. Appl. No. 16/098,023 to Yuichi Matsumoto et al., filed Oct. 31, 2018.

Communication pursuant to Article 94(3) EPC dated Aug. 13, 2020 for the related European Patent Application No. 17895308.9.

Sei Yuichi et al: "Privacy-Preserving Publication of Deep Neural Networks", 2016 IEEE 18th International Conference on High Performance Computing and Communications; IEEE 14th International Conference on Smart City; IEEE 2nd International Conference on Data Science and Systems (HPCC/Smartcity/DSS), IEEE, Dec. 12, 2016 (Dec. 12, 2016), pp. 1418-1425, XP033052562.

Mori Junichiro et al: "Predicting Customer Models Using Behavior-Based Features in Shops", Jun. 22, 2009 (Jun. 22, 2009), International Conference on Computer Analysis of Images and Patterns; CAIP 2017: Computer Analysis of Images and Patterns; [Lecture Notes in Computer Science; Lect. Notes Computer], Springer, Berlin, Heidelberg, pp. 126-137, XP047437808.

* cited by examiner

FIG. 3A
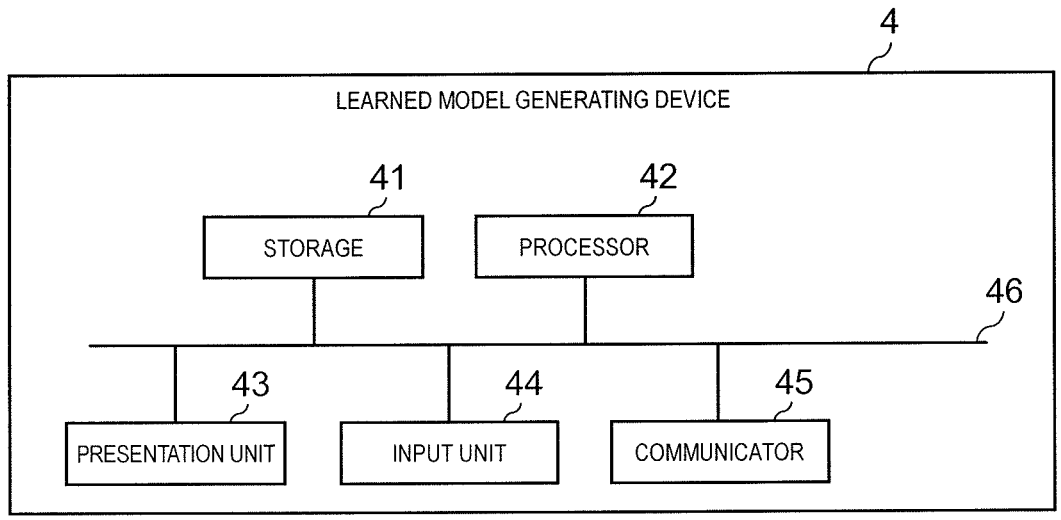
FIG. 3B
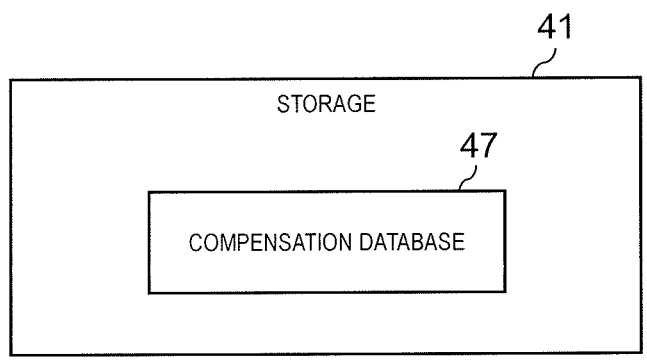
FIG. 3C
| LEARNED MODEL ID | CONSENTER ID | NUMBER OF APPEARANCES IN LEARNING DATA |
|---|---|---|
| 00001 | 1234 | 10 |
|  | 6789 | 30 |
| 00002 | 3210 | 5 |
|  | 4321 | 15 |
|  | 5432 | 20 |
| ... | ... | ... |

FIG. 4C

| LEARNED MODEL ID | MODEL ATTRIBUTE INFORMATION | PROVIDER ID | USER ID | VALID AND INVALID |
|---|---|---|---|---|
| 10001 | LEARNING OBJECTIVE: PERSON ATTRIBUTE ESTIMATION<br>LEARNING ENVIRONMENT: RETAIL STORE<br>LEARNING DATA ACQUISITION DATE:<br>X HOUR TO X HOUR X MONTH X DATE, 2017<br>NUMBER OF LEARNING DATA ITEMS: 10000 FRAME IMAGES<br>CAMERA RESOLUTION: 1K | Xxxxx | Aaaaa, Bbbbb | VALID |
| 10002 | ... | Xxxxx | Ccccc | VALID |
| 10003 | ... | Zzzzz | Aaaaa | VALID |
| 10004 | ... | Xxxxx | Bbbbb | INVALID |
| 10005 | ... | Xxxxx | Ddddd | VALID |
| ... | ... | ... | ... | ... |

LEARNED MODEL GENERATING METHOD, LEARNED MODEL GENERATING DEVICE, AND LEARNED MODEL USE DEVICE

TECHNICAL FIELD

The present disclosure relates to a method for generating a learned model and a learned model generating device for generating a learned model by machine learning based on sensing information obtained by sensing one or more sensing objects with one or more sensing devices, and a learned model use device.

BACKGROUND ART

In the related art, in order to optimize circulation of sensing data in a sensor network that uses sensing data, a technique for performing matching a sensor side metadata with an application side metadata to extract the sensor capable of providing the sensing data satisfying a request of the application is known. The sensor side metadata is information on a sensor that outputs the sensing data, and the application side metadata is information on an application that provides a service using the sensing data (see PTL 1).

CITATION LIST

Patent Literature

PTL 1: Japanese Patent No. 5445722

SUMMARY OF THE INVENTION

In recent years, it is strongly requested to pay attention to protection of personal information acquired by companies or the like, and it is also necessary to pay attention to the handling of personal information included in the sensing information for use in the generation of a learned model. That is, it is desirable to generate the learned model using only the sensing information of the sensing object for which use consent is obtained for the use of a model to be used for generating the learned model.

The present disclosure is based on the problems of such a conventional technology, and the main object is to provide a method for generating a learned model and a learned model generating device capable of generating the learned model after obtaining use consent from the sensing object and a learned model use device.

The method of generating a learned model in the present disclosure is a method for generating a learned model by machine learning and to be performed using at least one processor based on sensing information acquired by sensing one or more sensing objects with one or more sensing devices, the method including, by the processor, acquiring, for the one or more sensing objects, information indicating use consent as to whether the sensing information of the sensing object is used for generating the learned model, creating, in the sensing information of the one or more sensing objects, learning data by processing or deleting the sensing information of the sensing object for which the use consent is not obtained, and generating the learned model by machine learning using the learning data.

According to the present disclosure, it is possible to generate the learned model after obtaining the use consent from the sensing object.

BRIEF DESCRIPTION OF DRAWINGS

FIG. 3A is a block diagram illustrating a schematic configuration of a learned model generating device.

FIG. 3B is a block diagram illustrating a schematic configuration of a storage of the learned model generating device.

FIG. 3C is a diagram illustrating an example of a compensation database.

FIG. 4C is a diagram illustrating an example of a learned model database.

DESCRIPTION OF EMBODIMENTS

Figure 1:
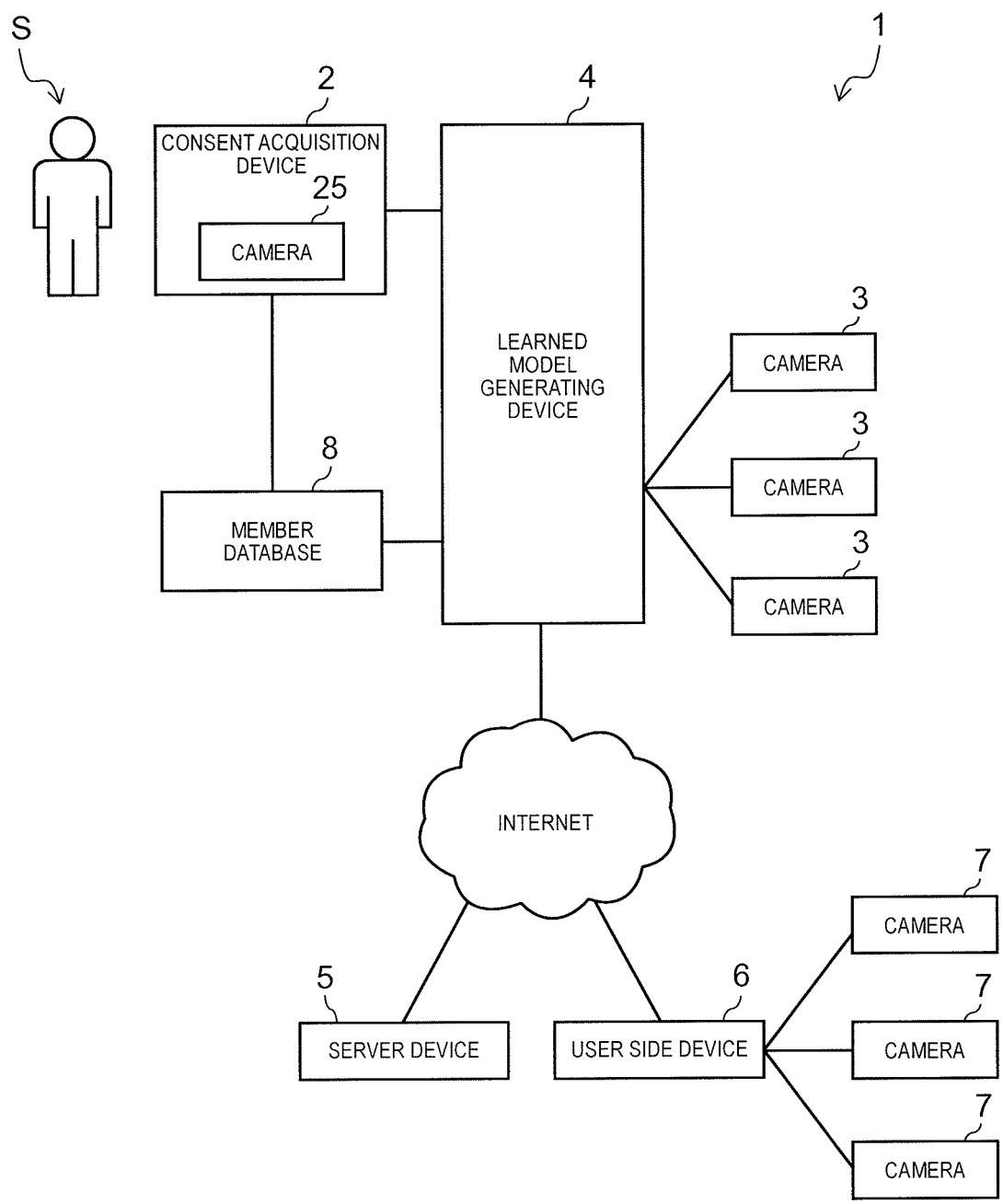
FIG. 1 is an overall configuration diagram of a learned model providing system according to the present disclosure.

A first disclosure made to solve the above problems is a method for generating a learned model by machine learning and to be performed using at least one processor based on sensing information acquired by sensing one or more sensing objects with one or more sensing devices, the method including, by the processor, acquiring, for the one or more sensing objects, information indicating use consent as to whether the sensing information of the sensing object is used for generating the learned model, creating, in the sensing information of the one or more sensing objects, learning data by processing or deleting the sensing information of the sensing object for which the use consent is not obtained, and generating the learned model by machine learning using the learning data.

According to the method for generating a learned model according to the first disclosure, in the sensing information of the one or more sensing objects, since the learned model can be generated by machine learning using the learning data created by processing or deleting the sensing information of the sensing object from which the use consent is not obtained, it is possible to generate the learned model after obtaining the use consent from the sensing object.

In addition, according to a second disclosure, in the first disclosure, an electronic signature is attached to the generated learned model, the electronic signature guaranteeing that processing or deleting the sensing information is performed on the sensing object from which use consent is not obtained when creating the learning data for the generated learned model.

According to the method for generating a learned model according to the second disclosure, by giving the electronic signature to the generated learned model, it is possible to guarantee that the processing or deleting the sensing information is performed on the sensing object from which the use consent is not obtained when creating the learning data used to generate the learned model.

In addition, according to the third disclosure, in the first or second disclosure, the sensing object is a person and the sensing information is a face image of the person, and when creating the learning data, in order to specify the face image of the person for which the use consent is not obtained, the processor acquires the face image of the person from whom the use consent is obtained.

According to the method for generating a learned model according to the third disclosure, in a case where the sensing object is the person and the sensing information is the face image of the person, it is possible to specify the face image of the person from whom the use consent is not obtained by using the face image of the person from whom the use consent is obtained.

In addition, according to a fourth disclosure, in the third disclosure, the face image is acquired by imaging a face of the person from whom the use consent is obtained.

According to the method for generating a learned model according to the fourth disclosure, it is possible to acquire the face image of the person from whom the use consent is obtained by imaging the face of the person.

In addition, according to a fifth disclosure, in the third disclosure, the face image is the face image of the person who stored in a portable terminal in advance acquired from the portable terminal possessed by the person from whom the use consent is obtained through near field communication.

According to the method for generating a learned model according to the fifth disclosure, it is possible to acquire the face image of the person from whom the use consent is obtained by near field communication of the face image of the person stored in the portable terminal in advance from the portable terminal possessed by the person from whom the use consent is obtained.

In addition, according to a sixth disclosure, in the third disclosure, a unique identifier to the person is given in advance and the face image of the person is associated with the identifier and registered in a member database in advance, and the face image is acquired by searching the member database based on the identifier given to the person from whom the use consent is obtained.

According to the method for generating a learned model according to the sixth disclosure, it is possible to acquire the face image of the person from whom the use consent is obtained by searching the member database based on the identifier given to the person from whom the use consent is obtained.

In addition, according to a seventh disclosure, in the second disclosure, when acquiring a notification that a verification result of the electronic signature given to the learned model is unverifiable from a learned model use device receiving the learned model, the processor performs invalid processing on the learned model.

According to the method for generating a learned model according to the seventh disclosure, when acquiring the notification that the verification result of the electronic signature given to the learned model is unverifiable from the learned model use device receiving the learned model, it is possible to perform invalid processing on the learned model.

In addition, according to an eighth disclosure, in the first disclosure, when acquiring a notification that the learned model is used from a learned model use device receiving the learned model, the processor gives compensation data of the sensing object from which the use consent is obtained when generating the learned model or a business operator involved in generating the learned model.

According to the method for generating a learned model according to the eighth disclosure, when acquiring a notification that the learned model is used from a learned model use device receiving the learned model, it is possible to give the compensation data of the sensing object from which the use consent is obtained when generating the learned model or a business operator involved in generating the learned model.

In addition, according to a ninth disclosure, in the eighth disclosure, the processor gives a unique identifier to the sensing object from which the use consent is obtained, associates the learned model generated by machine learning based on the sensing information of the sensing object to the identifier, and registers the associated the learned model to the compensation database, and when acquiring a notification that the learned model is used from a learned model use device receiving the learned model, the processor searches the compensation database based on the identifier associated with the learned model to obtain the sensing object from which the use consent is obtained when generating the learned model.

According to the method for generating a learned model according to the ninth disclosure, when acquiring a notification that the learned model is used from a learned model use device receiving the learned model, it is possible to obtain the sensing object from which the use consent is obtained when generating the learned model by searching the sensing object from the compensation database based on the identifier given to the learned model.

In addition, a tenth disclosure is a learned model generating device that generates a learned model by machine learning based on sensing information obtained by sensing one or more sensing objects with one or more sensing devices, the device including a communicator that performs communication between at least one of processors and one or more sensing devices, in which the processor acquires, for the one or more sensing objects, information indicating use consent as to whether the sensing information of the sensing object is used for generating the learned model, and create, in the sensing information of the one or more sensing objects, learning data by processing or deleting the sensing information of the sensing object for which the use consent is not obtained.

According to the learned model generating device according to the tenth disclosure, since in the sensing information of the one or more sensing objects, processing or deleting of the sensing information of the sensing object from which the use consent is not obtained can be performed, it is possible to create the learning data after obtaining the use consent from the sensing object.

In addition, an eleventh disclosure is a learned model generating device that generates a learned model by machine learning based on sensing information obtained by sensing one or more sensing objects with one or more sensing devices, the device including a communicator that performs communication between at least one of processors and one or more sensing devices, in which the processor, in the sensing information of the one or more sensing objects, generates the learned model by machine learning using learning data created by processing or deleting the sensing information of the sensing object from which use consent which is used for generating of the learned model is not obtained.

According to the learned model generating device according to the eleventh disclosure, since in the sensing information of the one or more sensing objects, the learned model can be generated by machine learning using the learning data created by performing processing or deleting of the sensing information of the sensing object from which the use consent is not obtained, it is possible to generate the learned model after obtaining the use consent from the sensing object.

In addition, according to a twelfth disclosure, in the eleventh disclosure, an electronic signature is attached to the generated learned model, the electronic signature guaranteeing that processing or deleting the sensing information is performed on the sensing object from which use consent is not obtained when creating the learning data for the generated learned model.

According to the learned model generating device according to the twelfth disclosure, by giving the electronic signature to the generated learned model, it is possible to guarantee that the processing or deleting the sensing information is performed on the sensing object from which the use consent is not obtained when creating the learning data used to generate the learned model.

In addition, a thirteenth disclosure is a learned model use device that uses the learned model provided from the learned model generating device of a twelfth disclosure, the device including at least one of processors, in which the processor verifies an electronic signature given to the learned model and in a case where the verification result of the electronic signature is acceptable, configures an analysis engine using the learned model to execute analysis processing.

Hereinafter, embodiments of the present disclosure will be described with reference to the drawings.

In recent years, research and development of machine learning technology using a neural network in a field of image recognition, sound recognition, and the like has been remarkable. Specifically, when deep learning technology is used, examples that can realize recognition accuracy which could not be obtained by the image recognition and sound recognition technology using a conventional feature amount base have been reported, and application to various industries is also examined. In deep learning, when learning image data or sound data is input to an input layer of a multilayered neural network, learning processing is performed so that output data (correct data) that is a correct recognition result is output from the output layer. Typically, the output data is annotation or metadata for the input data. For example, the output data is a name, a type, and an attribute of the imaged object that appears when the input data is an image, a word or a sentence that is uttered when the input data is a sound. In the learning processing of deep learning, a weight value of the coupling (synaptic coupling) between nodes configuring the neural network is updated using a known algorithm (for example, in a reverse error propagation method, adjust and update the weight value so as to reduce the error from the correct at the output layer, or the like). An aggregate of the weight values between the nodes on which the learning process is completed is called a "learned model". By applying the learned model to a neural network having the same configuration as the neural network used in the learning process (setting as the weight value of inter-node coupling), it is possible to output correct data with a constant precision as output data (recognition result) when inputting unknown input data, i.e., new input data not used in learning processing, into the neural network. Therefore, in a device different from a device that generates the learned model (that is, learning process), by configuring the neural network using the learned model and executing recognition processing, it is possible to perform the image recognition and voice recognition with learned recognition accuracy.

On the other hand, in recent years, it is strongly demanded to pay attention to the protection of personal information, specifically, it is required that the personal information expressed by face images included in the images or voice is to be acquired after specifying purpose of use and to be used only within the range of use received the consent in advance. As described above, it is assumed that the process of generating the learned model and the process of using the learned model are executed based on an intention of different entities using different devices, respectively. Therefore, it is also necessary to correspond with protection of personal information about subjects included in learning image data, voice data, or the like (hereinafter, referred to as "sensing information"), persons who are objects of shooting, subjects of utterance or the like (hereinafter, referred to as "sensing objects"). In the embodiments of the present disclosure, a system and a device for generating, providing, and using the learned model by using only the sensing information of the sensing object from which the use consent for being used for generating the learned model is obtained will be described.

Learned model providing system 1 according to the present disclosure is a system that generates the learned model by machine learning based on sensing information acquired by sensing one or more sensing objects with one or more sensing devices and provides the learned model to a user via a network such as the Internet. Hereinafter, a case of generating the learned model for estimating and predicting a person attribute (for example, age, gender, or the like) and a purchasing behavior tendency of a visitor from a captured image of the visitor at a retail store will be described.

FIG. 1 is an overall configuration diagram of learned model providing system 1 according to the present disclosure. As shown in FIG. 1, learned model providing system 1 according to the present disclosure is configured of consent acquisition device 2 that acquires the use consent that an acquired image of visitors is to be used for generating a learned model from visitor S, a plurality of cameras 3 (sensing device) that image visitor S, learned model generating device 4 that generates the learned model by machine learning based on a captured image imaged by camera 3, learned model providing device 5 (hereinafter, referred to as server device 5) that saves the learned model generated by learned model generating device 4, learned model use device 6 (hereinafter, referred to as user side device 6) that receives the learned model from server device 5, camera 7 to be used when performing processing using the learned model by the user side device 6, and member database 8.

Learned model generating device 4 is connected to consent acquisition device 2, camera 3, and member database 8 via wired or wireless communication such as a local area network (LAN). In addition, consent acquisition device 2 is connected to member database 8 via wired or wireless communication such as LAN. Learned model generating device 4, server device 5, and user side device 6 are connected to each other via a network such as the Internet. User side device 6 is connected to camera 7 via wired or wireless communication such as a local area network (LAN). The connection form between the above-described devices is not particularly limited, and connection via wired or wireless communication such as LAN, connection via a network such as the Internet, general-purpose interface (for example, a universal serial bus (USB) interface) via a communication cable can be used.

Consent acquisition device 2 is a general computer device and, for example, is configured integrally with a visit point giving device installed at an entrance of a store or the like for providing a visit point to visitor S via a portable terminal or a membership card possessed by visitor S. The configuration form of consent acquisition device 2 is not particularly limited, and may be integrated with, for example, a cash register device, an in-store guidance device, or the like. In addition, consent acquisition device 2 may not be formed integrally with other devices but may be configured alone.

Consent acquisition device 2 notifies visitor S (sensing object) that the use consent of the captured image (sensing information) of visitor S to be used for generating the learned model is requested on the screen, the voice, braille, or the like and receives input of permission of use consent from visitor S. In addition, consent acquisition device 2 is provided with camera 25 for imaging a face of visitor S in a case where the use consent is obtained from visitor S.

Figure 2:
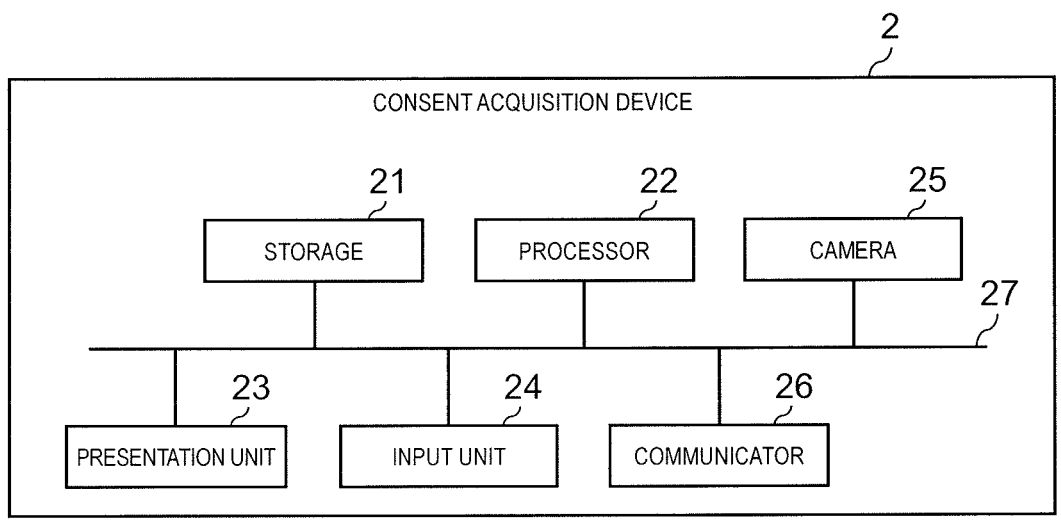
FIG. 2 is a block diagram illustrating a schematic configuration of a consent acquisition device.

FIG. 2 is a block diagram illustrating a schematic configuration of consent acquisition device 2. As shown in FIG. 2, consent acquisition device 2 includes storage 21, processor 22, presenter 23, input unit 24, camera 25, communicator 26, and bus 27 connecting these components.

Storage 21 is a storage device (storage) such as a read only memory (ROM) or a hard disk, and stores various programs and various data items for realizing each function of consent acquisition device 2. Processor 22 is, for example, a central processing unit (CPU), reads various programs and various data items from storage 21 onto a random access memory (RAM) not shown, and executes each processing of consent acquisition device 2.

Presenter 23 is configured of, for example, a display such as a liquid crystal display panel, a speaker, a braille display, and the like, and is used for presenting visitor S requesting the use consent. Input unit 24 is configured of an input device such as a liquid crystal touch panel, a microphone, and the like, and is used by visitor S to input permission of the use consent. Camera 25 is a general imaging device such as a CCD camera, and is disposed at a position capable of imaging the face of visitor S and images the face of visitor S from whom the use consent is obtained. As far as camera 25 is capable of imaging the face of visitor S, its form, function, arrangement, quantity, and the like are not particularly limited, and it is possible to be modified variously. Communicator 26 communicates with learned model generating device 4 and member database 8 via wired or wireless communication such as a LAN.

Camera 3 is a general imaging device such as a CCD camera, and is installed on a wall, a ceiling, or the like in various places in the store, and images the predetermined monitored area in the store as a still image or a video in time series. The captured image (sensing information) captured by camera 3 is used as learning data when machine learning is performed by learned model generating device 4. Camera 3 includes a communicator (not shown), and a captured image captured by camera 3 is transmitted to learned model generating device 4 via the communicator. As far as camera 3 is capable of imaging the predetermined monitored area, its form, function, arrangement, quantity, and the like are not particularly limited, and it is possible to be modified variously.

Learned model generating device 4 is a general computer device, and generates the learned model by machine learning based on a captured image (sensing information) received from camera 3. Specifically, the learned model is generated by deep learning using a multilayered neural network based on the captured image of camera 3.

FIG. 3A is a block diagram illustrating a schematic configuration of learned model generating device 4, and FIG. 3B is a block diagram illustrating a schematic configuration of a storage of learned model generating device 4. As shown in FIG. 3A, learned model generating device 4 includes storage 41, processor 42, display 43, input unit 44, communicator 45, and bus 46 connecting these components.

Storage 41 is a storage device (storage) such as a ROM or a hard disk, and stores various programs and various data items for realizing each function of learned model generating device 4. In addition, as shown in FIG. 3B, storage 41 stores compensation database 47 for storing various data items used for compensation to be described later.

FIG. 3C is a diagram illustrating an example of compensation database 47. Each learned model is given a unique ID (learned model ID), and all persons included in the image or the like which is learning data used when generating the learned model (hereinafter, referred to as "consenter") also has the unique ID (consenter ID). Then, as shown in FIG. 3C, in compensation database 47, in association with the learned model ID, the consenter ID of the consenter is stored with the appearance frequency in the learning data.

Processor 42 is, for example, the CPU, reads various programs and various data items from storage 41 onto the RAM not shown, and executes each processing of learned model generating device 4. Display unit 43 is configured of a display such as a liquid crystal display panel and is used for displaying the processing result in processor 42 and the like. Input unit 44 is configured of an input device such as a keyboard, mouse, and the like, and is used for operating learned model generating device 4. The communicator 45 communicates with consent acquisition device 2, camera 3, and member database 8 via wired or wireless communication such as a LAN. In addition, communicator 45 communicates with server device 5 via a network such as the Internet.

The server device 5 is a general computer device, and stores one or more learned models received from learned model generating device 4 in learned model database 57 (see FIG. 4B) to be described later. When server device 5 receives the use request from user side device 6, server device 5 selects a learned model suitable for the usage request from one or more learned models stored in learned model database 57 and transmits the selected learned model to user side device 6. In this manner, server device 5 may be configured as a cloud server for providing the pre-saved learned model to user side device 6.

Figure 4A:
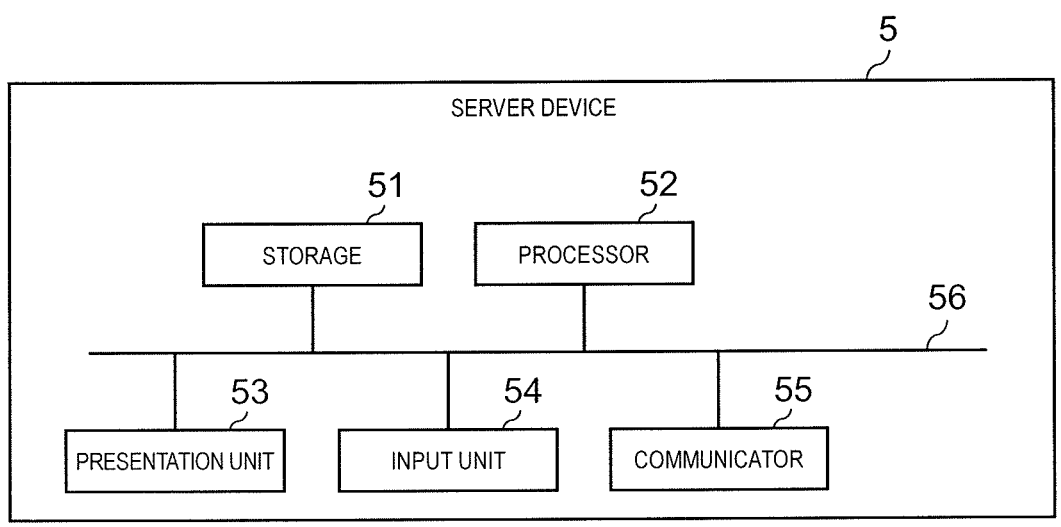
FIG. 4A is a block diagram illustrating a schematic configuration of a learned model providing device.
Figure 4B:
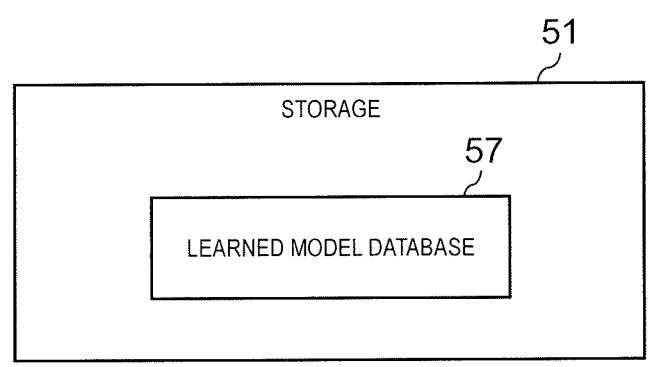
FIG. 4B is a block diagram illustrating a schematic configuration of a storage of the learned model providing device.

FIG. 4A is a block diagram illustrating a schematic configuration of server device 5, and FIG. 4B is a block diagram illustrating a schematic configuration of the storage of server device 5. As shown in FIG. 4A, server device 5 includes storage 51, processor 52, display 53, input unit 54, communicator 55, and bus 56 connecting these components.

Storage 51 is a storage device (storage) such as a read only memory (ROM) or a hard disk, and stores various programs and various data items for realizing each function of server device 5. In addition, as shown in FIG. 4B, storage 51 stores learned model database 57 for saving the learned model.

FIG. 4C is a diagram illustrating an example of learned model database 57. As shown in FIG. 4C, in learned model database 57, in association with the learned model ID, model attribute information of the learned model, an ID (provider ID) assigned given to the device that generates and provides the learned model or the operator of the device, an ID (user ID) of the device using the learned model or the operator of the device, and a invalidation flag indicating whether the learned model is invalid are stored. The model attribute information includes, for example, the learning purpose of the learned model, the learning environment, the incoming date and time of the learning data, the number of learning data items, the type of learning data, or resources and capabilities (resources and specifications) of the device used for machine learning (camera 3 and learned model generating device 4).

Processor 52 is, for example, the CPU, reads various programs and various data items from storage 51 onto the RAM not shown, and executes each processing of server device 5. Display unit 53 is configured of a display such as a liquid crystal display panel and is used for displaying the processing result in processor 52 and the like. Input unit 54 is configured of an input device such as a keyboard, mouse, and the like, and is used for operating server device 5. Communicator 55 communicates with learned model generating device 4 and user side device 6 via wired or wireless communication such as the Internet. In a case where server device 5 is configured as a cloud server, display 53 and input unit 54 are not indispensable components, and may be operated via a Web interface from a browser such as a client PC or the like via the Internet. In this case, the display and the input device of the client PC or the like substitute the functions of display 53 and input unit 54.

User side device 6 is a general computer device and is used for performing image analysis processing using a learned model provided from server device 5 and processing such as new machine learning. In the present embodiments, user side device 6 performs image analysis processing using the learned model provided from server device 5. As described above, provision of the learned model from server device 5 to user side device 6 is performed by user side device 6 transmitting a use request to server device 5.

Figure 5:
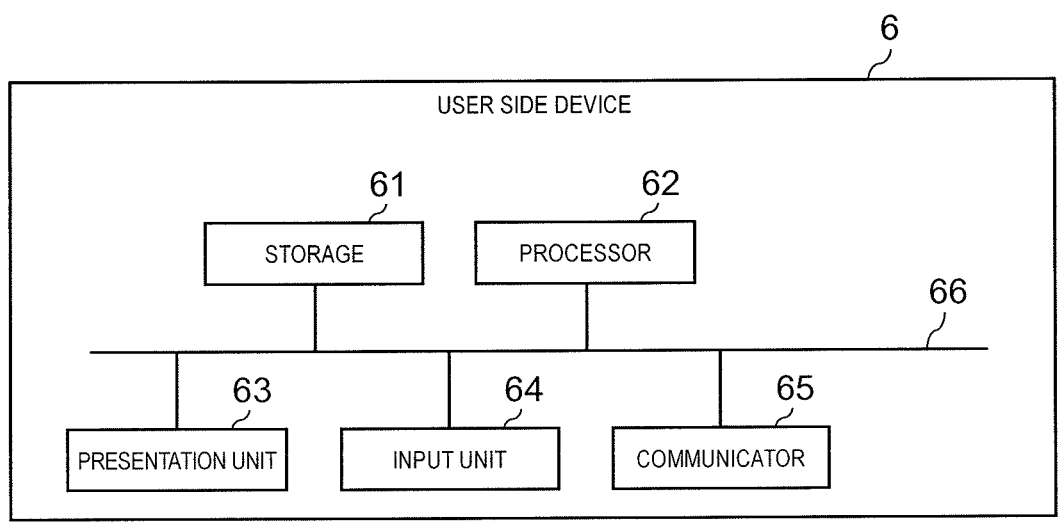
FIG. 5 is a block diagram illustrating a schematic configuration of a user side device.

FIG. 5 is a block diagram illustrating a schematic configuration of user side device 6. As shown in FIG. 5, user side device 6 includes storage 61, processor 62, display 63, input unit 64, communicator 65, and bus 66 connecting these components.

Storage 61 is a storage device (storage) such as a ROM or a hard disk, and stores various programs and various data items for realizing each function of user side device 6. Processor 62 is, for example, the CPU, reads various programs and various data items from storage 61 onto the RAM not shown, and executes each processing of user side device 6. Display 63 is configured of a display such as a liquid crystal display panel and is used for displaying the processing result in processor 62 and the like. Input unit 64 is configured of an input device such as a keyboard, mouse, and the like, and is used for operating user side device 6. Communicator 65 communicates with server device 5 via a network such as the Internet. In addition, communicator 65 communicates with camera 7 via wired or wireless communication such as a LAN.

Camera 7 is a general imaging device such as a CCD camera and images an image (in this embodiment, an image including the face of the person) used in image analysis processing performed by user side device 6. Camera 7 includes a communicator not shown, and a captured image imaged by camera 7 is transmitted to user side device 6 via the communicator. As far as camera 7 is capable of imaging the image to be used for image analysis processing performed by user side device 6 or new machine learning, its form, function, arrangement, quantity, and the like are not particularly limited, and it is possible to be modified variously.

Member database 8 stores attribute information (for example, information on person attributes and information on purchase behavior attributes), face images, and the like of members of the store in association with the member ID of the member. The purchase behavior history includes categories of products purchased by the member in the past, categories of products (that is, interesting products) that the member picked up in the past, and the like. Therefore, when visitor S is a member of the store, by searching the member database based on the member ID, it is possible to acquire the attribute information and the face image of visitor S. In a case where the face image of visitor S can be acquired based on the member ID in this manner, the face image stored in the member database is used as the face image of visitor S instead of acquiring the face image of visitor S by camera 25 (in this case, camera 25 is not an essential configuration).

The above-described devices of learned model providing system 1 are not limited to computer devices, and other information processing devices (for example, servers or the like) capable of obtaining similar functions can also be used. In addition, at least a part of the functions of the each device of learned model providing system 1 may be replaced by other known hardware processing.

Next, the operation procedure of each processing in learned model providing system 1 will be described with reference to the sequence diagrams shown in FIGS. 6 to 9.

Figure 6:
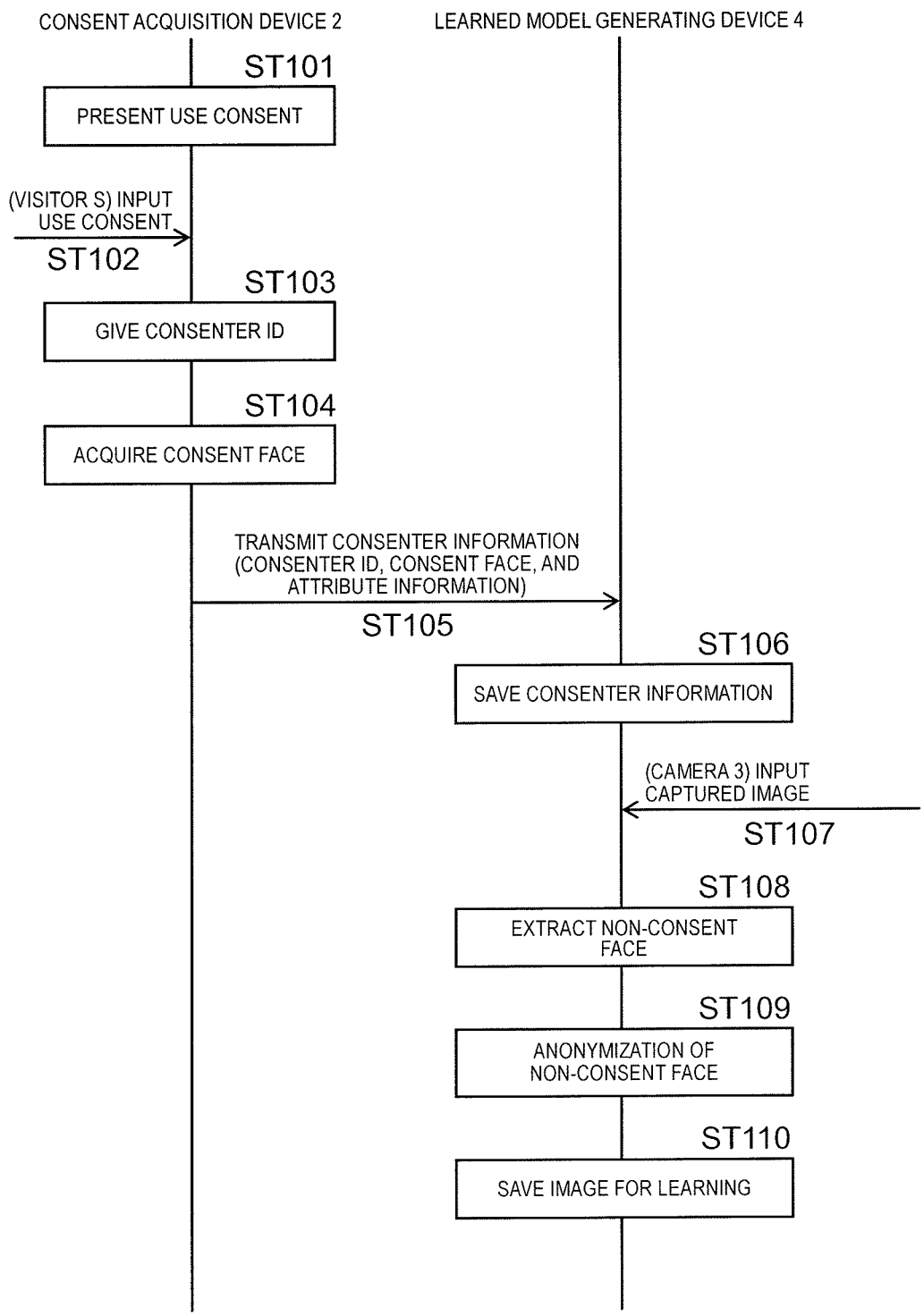
FIG. 6 is a sequence diagram illustrating an operation procedure of consent acquisition processing and anonymization processing in a learned model providing system.

FIG. 6 is a sequence diagram illustrating an operation procedure of consent acquisition processing and anonymization processing in learned model providing system 1. The consent acquisition processing and the anonymization processing are performed by consent acquisition device 2 and learned model generating device 4. Hereinafter, the operation procedure of the consent acquisition processing and the anonymization processing by consent acquisition device 2 and learned model generating device 4 will be described with reference to the sequence diagram of FIG. 6.

First, a request for a use consent of using the captured image (sensing information) of visitor S (sensing object), imaged by cameras 3 installed in various places inside the store, to generate the learned model is presented in presenter 23 of consent acquisition device 2 by a screen, a sound, a braille, or the like (step ST101). This use consent may include consent to a fact that the generated learned model is provided to a third party.

After understanding the use consent presented in presenter 23 of consent acquisition device 2, visitor S operates input unit 24 of consent acquisition device 2 and inputs availability of use consent (step ST102). When input unit 24 is configured of a liquid crystal touch panel, visitor S inputs availability of use consent by touching a button or an icon displayed on the liquid crystal touch panel. In a case where input unit 24 is configured of a microphone, visitor S inputs propriety of use consent by a voice. In a case where the use consent is obtained from visitor S, the processing proceeds to the next step ST103. In a case where the use consent cannot be obtained from visitor S, the processing is ended and the processing returns to the previous step ST101.

In a case where the use consent is obtained from visitor S, a unique consenter ID is given to visitor S (that is, the consenter) (step ST103). In the present embodiment, since consent acquisition device 2 is configured integrally with the visiting point giving device, in the case where consenter S is a member of the store, when the visit point is given by a visiting point giving device, the member ID acquired from the portable terminal or the member card of the visitor may be used as the consenter ID of consenter S.

In addition, in a case where the use consent is obtained from visitor S, camera 25 of consent acquisition device 2 images the face of visitor S (consenter). The face image of consenter S imaged by camera 25 (hereinafter, referred to as "consent face") is associated with the consenter ID. In the case where consenter S is a member of the store and the face image of consenter S is associated with the member ID of consenter S and registered in member database 8 in advance, the consent face may be acquired by searching member database 8 based on member ID.

In addition, attribute information (for example, information on person attributes and information on purchase behavior attributes) of consenter S is given to the consent face as its metadata. This attribute information may be input by a user of learned model generating device 4 by operating input unit 44 of the device 4 or in a case where consenter is a member of the store, the attribute information may be acquired from the member information registered in member database 8 in advance.

The consenter information including the consenter ID of the consenter, the consent face, and attribute information of the consenter is transmitted from consent acquisition device 2 to learned model generating device 4 (step ST105). Learned model generating device 4 saves the consenter information received from consent acquisition device 2 in storage 41 (step ST106). Learned model generating device 4 receives captured images imaged by cameras 3 from a plurality of cameras 3 installed in various places in the store (step ST107). The captured image received from camera 3 is stored in storage 41 of learned model generating device 4. Subsequently, learned model generating device 4 detects a face area of the person from the captured image. Learned model generating device 4 collates the face area detected from the captured image with the consent face stored in storage 41. Thereby, the face area other than the consent face (hereinafter, referred to as "non-consent face") is specified and extracted (Step ST108). In this manner, the consent face acquired by consent acquisition device 2 is used as data for collation for extracting a non-consent face from the captured image imaged by camera 3. The processing of extracting a non-consent face may be performed by real time processing or batch processing.

Next, learned model generating device 4 performs anonymization processing on the area of the non-consent face in the captured image (step ST109). As the anonymization processing, for example, face deleting processing, mosaic processing, or masking processing can be used. The captured image which is subjected to the anonymization processing is stored in storage 41 as a learning image (learning data) for use in machine learning (step ST110).

In this manner, learned model providing system 1 according to the present disclosure can create the learning data not containing the non-consent face by performing anonymization processing of the non-consent face (sensing information) of visitor S (sensing object) from which the use consent to be used for generating the learned model cannot be obtained.

Figure 7:
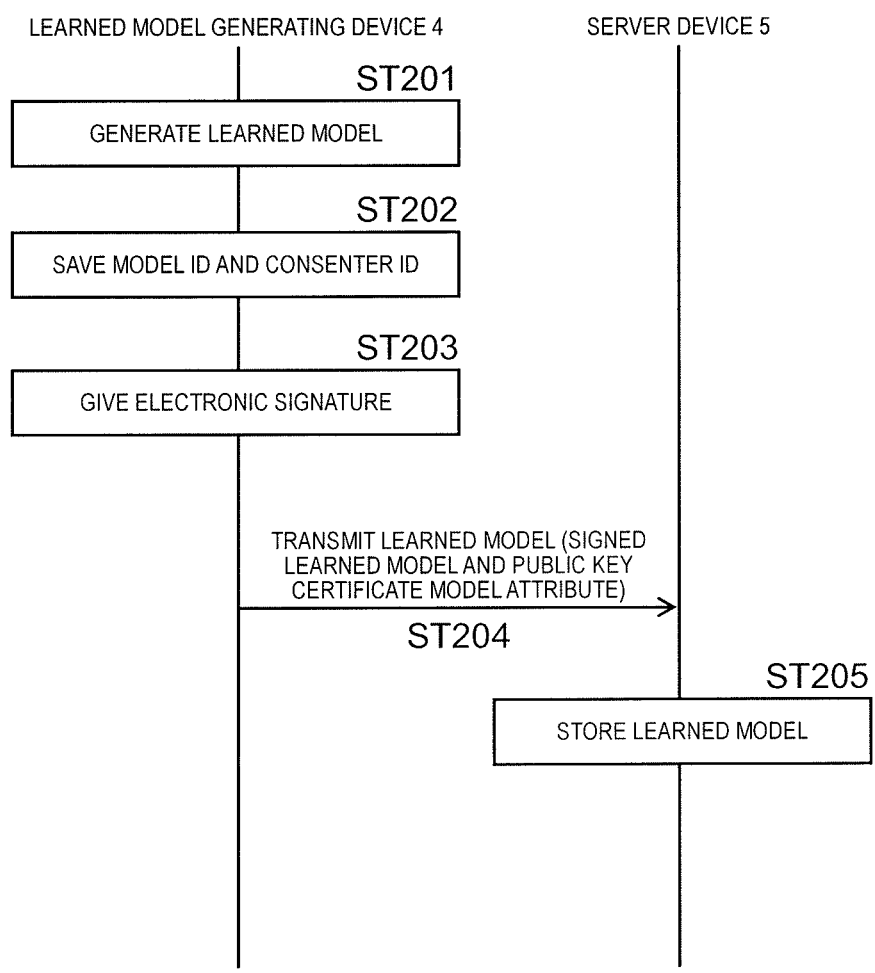
FIG. 7 is a sequence diagram illustrating an operation procedure of learned model generation processing and electronic signature assignment processing in the learned model providing system.

FIG. 7 is a sequence diagram illustrating the operation procedure of the learned model generation processing and the electronic signature giving processing in learned model providing system 1. The learned model generating processing and the electronic signature giving processing are performed by learned model generating device 4 and server device 5. Hereinafter, referring to the sequence diagram of FIG. 7, the operation procedure of the learned model generating processing and the electronic signature giving processing by learned model generating device 4 and server device 5 will be described.

First, learned model generating device 4 performs machine learning using the learning image (learning data) saved in storage 41 and the correct data (teacher data) corresponding to the learning image, and generates a learned model (step ST201). The correct data is, for example, a person attribute of visitor S (for example, age, gender, or the like) and purchasing behavior attributes (for example, categories of products that purchased in the past, or a category of products that picked up in the past), and is set based on manual input by input unit 44 or the consenter information stored in storage 41. Specifically, in deep learning or the like using the multilayered neural network, the learning processing is performed by updating the inter-node coupling parameter (weight value) of the neural network so that the error between the output data corresponding to the input learning data and the correct data becomes small based on the well-known method such as a reverse error propagation method to generate the learned model (that is, it is a set of internode coupling parameters, which may be expressed in a matrix form or may be represented by a simple numerical set) as the leaning processing result. As described above, in the present embodiment, when captured image imaged by cameras 3 installed in various places inside the store is input, the learned model for outputting the person attributes and purchasing behavior attributes of visitor S as estimation and prediction results. The learned model that is generated in such manner, since it is possible to predict the person attributes and purchasing behavior attributes of visitor S in real time, the learned model can be used in inventory management or order management of products by estimating purchasing behavior attributes of a plurality of visitors. The unique model ID (learned model ID) is given to the generated learned model. The model ID is saved in compensation giving database 47 in association with the consenter ID of the consenter from whom the use consent is obtained before the learning data creation used to generate the learned model (step ST202).

Next, when learned model generating device 4 creates the learning image (learning data) used for generating the learned model with respect to the generated learned model, the electronic signature that guarantees that anonymization processing of the non-consent face of visitor S from whom the use consent cannot be obtained is performed is given (step ST203). Giving the electronic signature is performed based on a publicly known method using a public key (electronic signature using a public key certificate issued by a certificate authority).

The signed learned model to which the electronic signature is given, the public key certificate used for giving the electronic signature, and the model attribute information of the learned model are transmitted to server device 5 (step ST204). As described above, model attribute information includes, for example, the learning purpose of the learned model, the learning environment, the incoming date and time of the learning data, the number of learning data items, the type of learning data, or resources and capabilities (resources and specifications) of the device used for machine learning (camera 3 and learned model generating device 4).

Server device 5 stores the signed learned model, public key certificate, and model attribute information received from learned model generating device 4 in learned model database 57 (step ST205).

In this manner, learned model providing system 1 according to the present disclosure can generate the learned model from the leaning image (learning data) not containing non-consent face, create the leaning image (learning data) used when generating the learned model with respect to the generated learned model, and give the electronic signature that guarantees that anonymization processing (processing or deleting) of the non-consent face (sensing information) of visitor S (sensing object) from whom the use consent cannot be obtained is performed.

Figure 8:
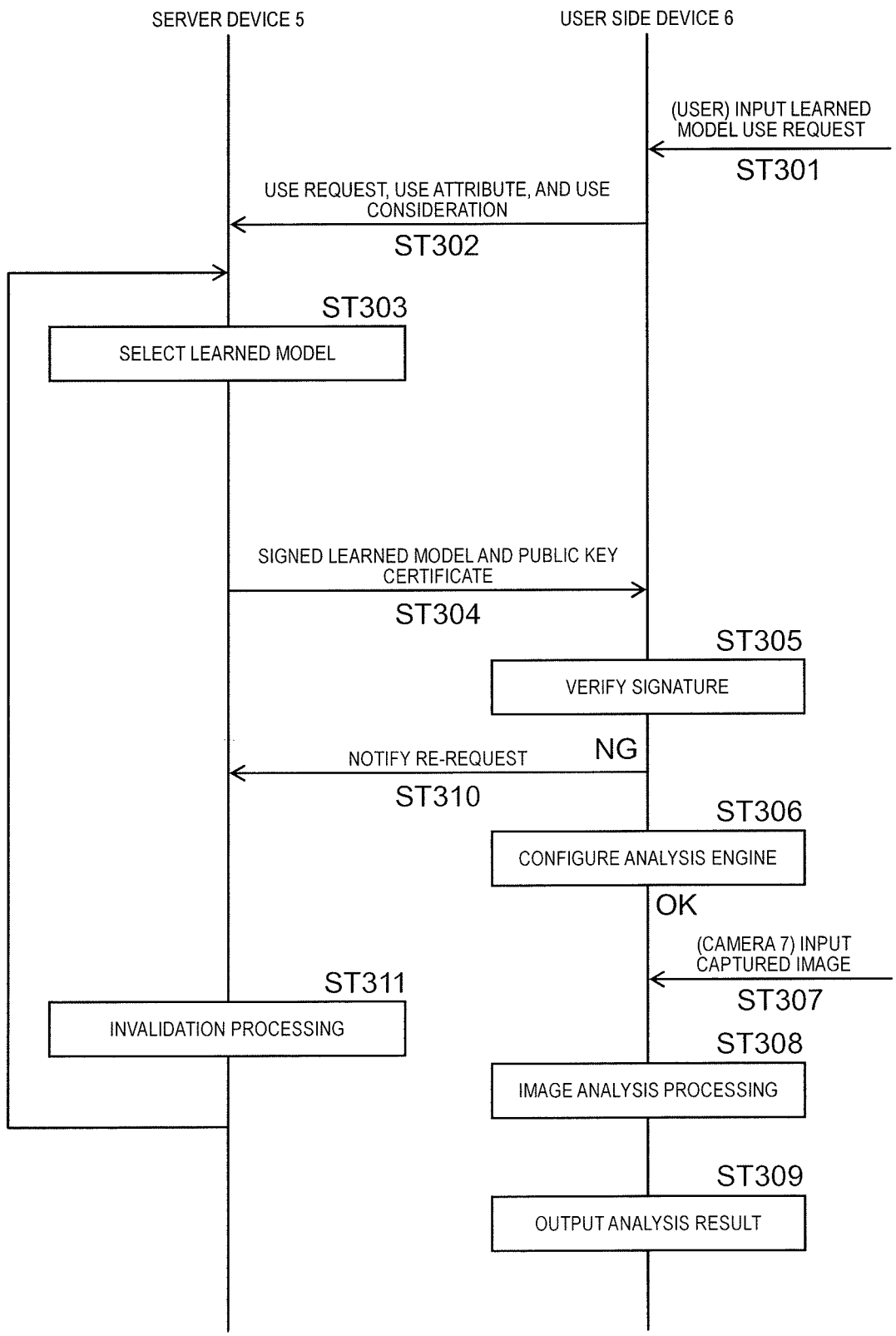
FIG. 8 is a sequence diagram illustrating an operation procedure of learned model use request processing and signature verification processing in the learned model providing system.

FIG. 8 is a sequence diagram illustrating operation procedures of use request processing and the signature verification processing of the learned model in learned model providing system 1. The use request processing and the signature verification processing of the learned model are performed by server device 5 and user side device 6. Hereinafter, operation procedures of the use request processing and the signature verification processing of the learned model by server device 5 and user side device 6 will be described with reference to the sequence diagram of FIG. 8.

First, a user who desires to receive provision of the learned model from server device 5 inputs a request to use the learned model to user side device 6 (step ST301). User side device 6 to which the request for using the learned model is input from the user transmits the use request of the learned model, use attribute information of user side device 6 and usage compensation of the learned model to user side device 6 (Step ST302). The use attribute information includes, for example, the usage purpose of the user, the resources and capabilities (resources and specifications) of user side device 6 and camera 7, the learning environment and the number of learning data items when using the learned model in user side device 6. The usage compensation of the learned model is, for example, a virtual currency or a point.

When server device 5 receives the learned model use request, the use attribute information, and the usage compensation from user side device 6, server device 5 uses the known matching method to perform matching the use attribute information received from user side device 6 with the model attribute information of the learned model stored in model database 57, and selects the signed learned model matching the use attribute information (step ST303). The selected learned model is transmitted to user side device 6 by attaching the corresponding public key certificate thereto (step ST304).

In order to confirm that tampering or counterfeiting is not performed on the learned model received from server device 5, user side device 6 verifies the validity of the electronic signature given to the learned model using the public key of the public key certificate attached to the learned model (step ST305).

In a case where the verification result is OK (step ST305: OK), the analyzing engine is configured by loading the learned model into the analysis engine program (program configuring the neural network and executing analysis processing based thereon) (Step ST306). After configuring the analysis engine, the captured image is input from camera 7 to user side device 6 (step ST307), and a predetermined image analysis (in this embodiment, the person attribute of the visitor or a purchase behavior attribute estimation and prediction) is executed by using the input captured image (step ST308), and the analysis result is output (step ST309).

In a case where the verification result is invalid (NG) (step ST305: NG), user side device 6 selects another learned model and transmits the information indicating that the verification result is invalid and the re-request notification for requesting re-transmission by selecting the other learned model to server device 5 (step ST310).

When the re-request notification of the learned model is received from user side device 6, server device 5 writes an invalidation flag in the learned model in which the verification result is NG in learned model database 57, whereby performing the invalid processing of the learned model (Step ST311). Thereafter, the processing returns to step ST303, matching is performed again, and a learned model is newly selected.

In this manner, in learned model providing system 1 according to the present disclosure, user side device 6 can receive provision of the learned model suitable for the use attribute information of user side device 6 from server device 5. In addition, in a case where the verification result of the electronic signature given to the learned model provided to user side device 6 is unverifiable, the invalid processing can be performed on the learned model.

Figure 9:
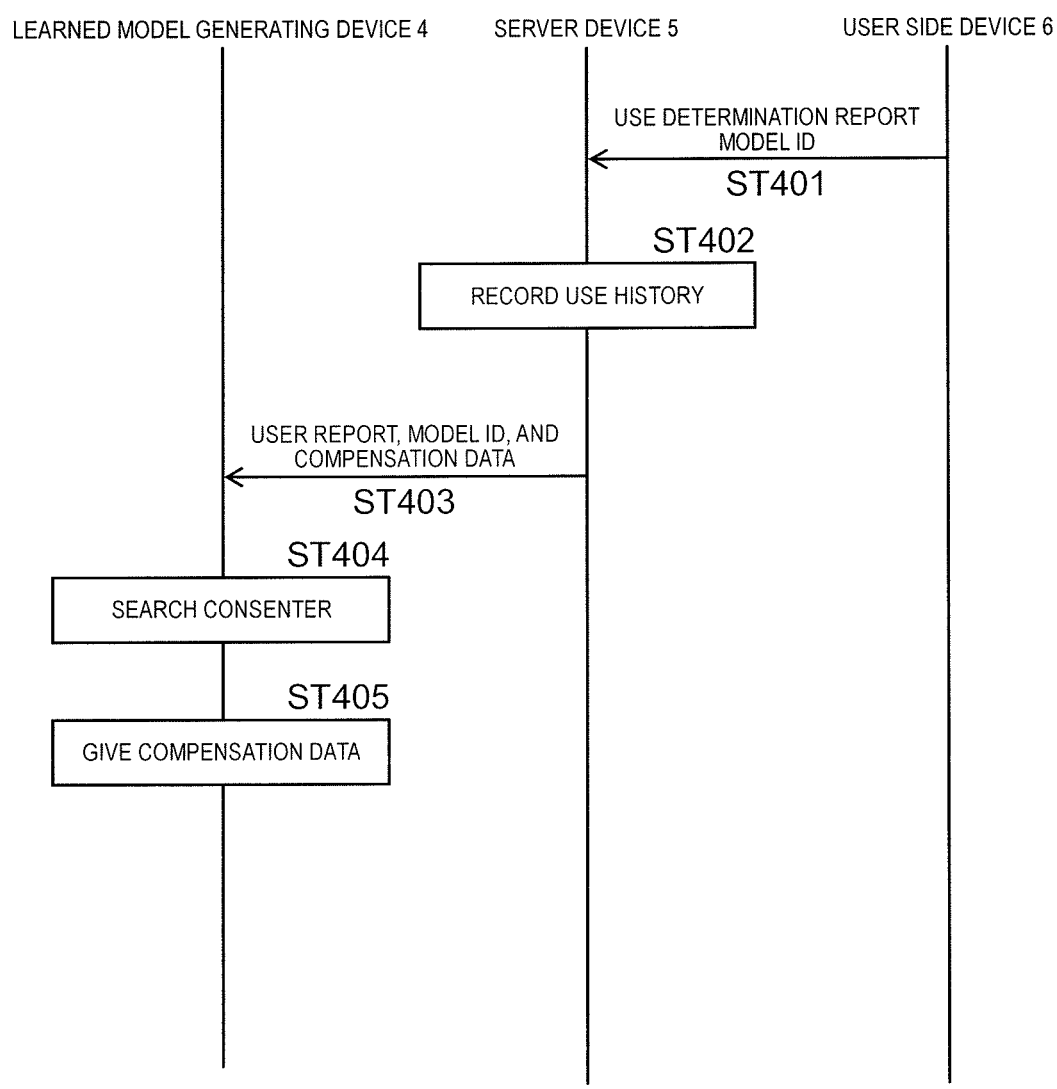
FIG. 9 is a sequence diagram illustrating an operation procedure of learned model use report processing and compensation processing to consent in the learned model providing system.

FIG. 9 is a sequence diagram illustrating the operation procedure of a learned model use report processing in learned model providing system 1 and compensation processing to the consenter. The use report processing of the learned model and the compensation processing to the consenter are performed by learned model generating device 4, server device 5, and user side device 6. Hereinafter, the operation procedure of the learned model use report processing and the compensation processing to the consenter by learned model generating device 4, server device 5, and user side device 6 will be described with reference to the sequence diagram of FIG. 9.

First, in a case where the result of the signature verification in step ST305 of the sequence diagram of FIG. 8 is OK (step ST305: OK), user side device 6 transmits the use determination report indicating that the learned model is determined to be used and the model ID of the learned model which is determined to be used to server device 5 (step ST401).

When receiving the use determination report from user side device 6, server device 5 records the use history indicating that the learned model provided to user side device 6 is used in learned model database 57 in association with the model ID of the learned model (step ST402).

Next, server device 5 transmits the use report indicating that the learned model provided to user side device 6 is used, the model ID of the learned model, and the compensation data to learned model generating device 4 (Step ST403). The compensation data is data to be given as compensation to the consenter from whom the consent for use is obtained when generating the learned model, and is, for example, data such as a virtual currency or a point.

When receiving the use report from server device 5, learned model generating device 4 searches for the consenter from whom the use consent is obtained when generating the learned model determined to be used by user side device 6 (Step ST404). Specifically, the consenter ID is obtained by searching compensation database 47 based on the model ID of the learned model determined to be used by user side device 6. As described above, since the model ID is stored in compensation database 47 in association with the consenter ID, the consenter ID can be obtained based on the model ID.

Learned model generating device 4 gives the compensation data (for example, data such as virtual currency and points) to the consenter (step ST405). Giving the compensation data to the consenter may be performed to the portable terminal or the member card of the consenter from consent acquisition device 2 or the visit point giving device, for example, at the time of the next visiting of the consenter. The method of giving the compensation data to the consenter is not limited thereto, and may be various other methods. In the case where there are a plurality of consenters to whom compensation data is to be given, it is advisable to distribute the compensation data to each consenter at a predetermined proportion. The proportion of distribution may be determined based on the contribution degree (for example, number of appearances, or the like) of the consenter in the learning image used for generating the learned model.

In this manner, in learned model providing system 1 according to the present disclosure, when server device 5 receives the use determination report from user side device 6, the use history of the learned model is recorded in learned model database 57, and the compensation data can also be given to a consenter from whom the use consent is obtained when generating the learned model.

Although the present disclosure has been described based on the specific embodiments, these embodiments are merely examples, and the present disclosure is not limited by these embodiments. In addition, all the configuration elements of the method for generating a learned model and the learned model generating device according to the present disclosure described in the above embodiment are not necessarily essential, and it is possible to appropriately select at least the element as long as they do not deviate from the scope of the present disclosure.

Figure 10:
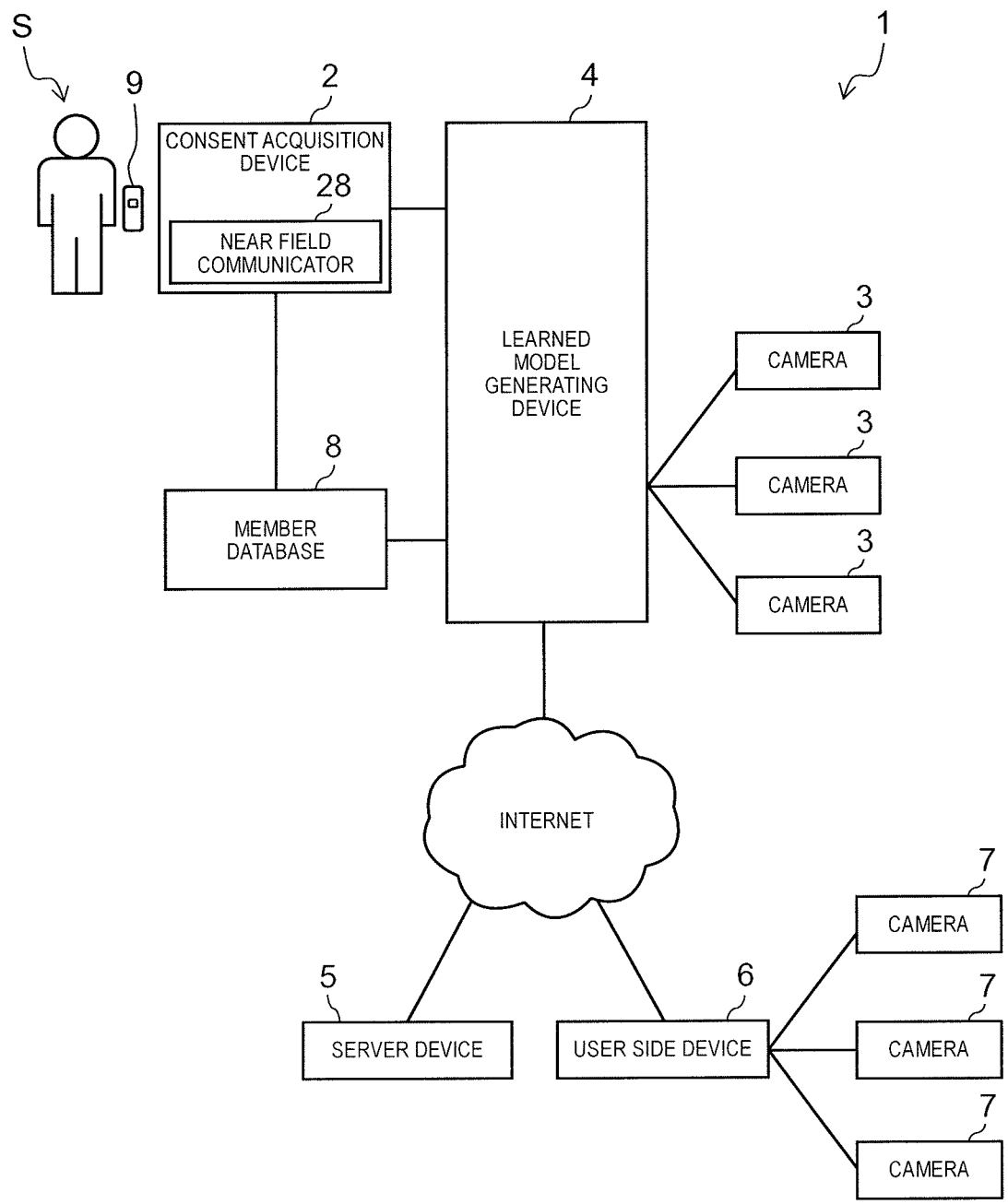
FIG. 10 is an overall configuration diagram of a learned model providing system according to another embodiment.
Figure 11:
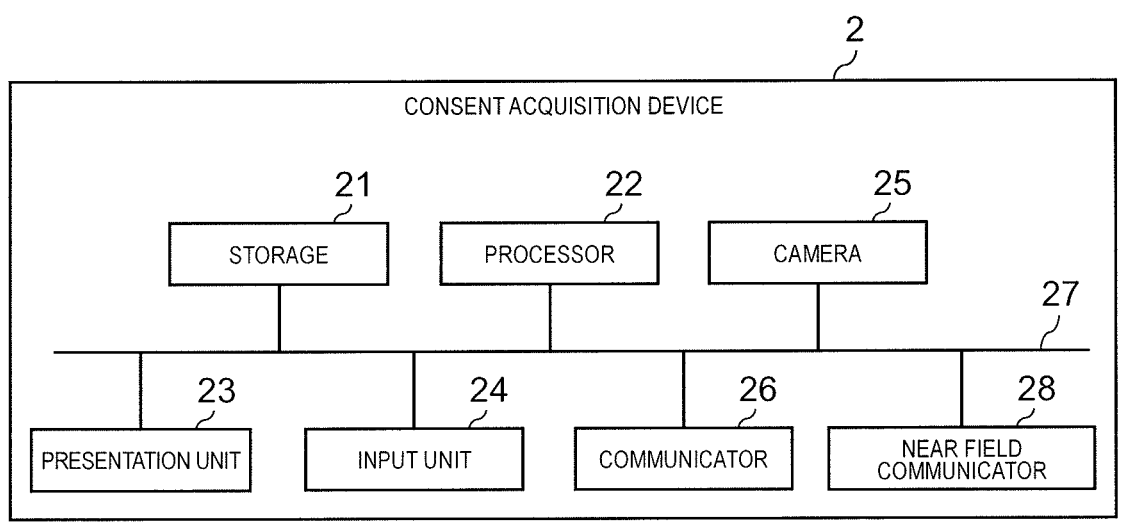
FIG. 11 is a block diagram illustrating a schematic configuration of a consent acquisition device according to the other embodiment.

For example, in the present embodiments, the learning image (learning data) used for the machine learning in learned model generating device 4 is generated by performing anonymization processing to the face area (non-consent face) other than the face image (consent face) of consenter S imaged by camera 25 of consent acquisition device 2 among the face areas included in the captured image imaged by camera 3 installed in various places in the store. However, the face image (consent face) of consenter S stored in advance in the portable terminal possessed by the consenter S may be acquired from the portable terminal of consenter S by near field communication and may generate a learning image by performing anonymization processing based on the collation between the consent face and the captured image by camera 3. In this case, as shown in FIGS. 10 and 11, consent acquisition device 2 is provided with near filed communicator 28 and performs near field communication with portable terminal 9 of consenter S via near filed communicator 28. Thereby, the face image (consent face) of consenter S stored in advance in portable terminal 9 is acquired. As near field communication, for example, WiFi (registered trademark), Bluetooth (registered trademark), infrared communication, or the like can be used.

In the present embodiments, all of the processings of the anonymization processing, the learned model generating processing, the electronic signature giving processing, and the compensation processing are performed by learned model generating device 4. However, in the present embodiment, at least part of each processing may be performed by server device 5. For example, the anonymization processing and the compensation processing may be performed by learned model generating device 4, and the learning model generating processing and electronic signature giving processing may be performed by server device 5.

In addition, in the present embodiment, the compensation data is configured to be given to the consenter. However, it is not always necessary to give the compensation data to the consenter. A store business operator having camera 3 and learned model generating device 4 or to another business operator involved in generation of the learned model.

In addition, in the present embodiments, the consent about being used for generation of the learned model is acquired from the sensing object. However, the anonymization processing of the captured image of camera 3 for the non-consent sensing object may be performed after acquiring an intention (non-consent) not consent to be used for generating of the learned model or selecting the consent or the non-consent to be used for generating the learned model.

In addition, in the present embodiments, an example that the captured image imaged by the camera is used as the sensing information is described. However, the attribute and behavior of the person may be learned based on the sound data acquired by a microphone or positional data acquired using GPS, wireless tag, or Bluetooth (registered trademark) beacon or the like. In this case, by performing analysis using the learned model, it become possible to predict and estimate the attribute and behavior of the person from the sound or positional data, and the like.

In addition, in the present embodiments, the verification processing of the electronic signature given to the learned model is configured to be performed by user side device 6. However, when server device 5 receives the learned model from learned model generating device 4, the verification processing of the electronic signature may be performed in server device 5. In this case, the invalidation processing of the learned model can be executed as processing closed inside server device 5.

In the present embodiments, the object of machine learning is to generate the learned model for estimating attributes (for example, age, gender, or the like) of the person and the purchasing behavior tendency from the captured image of the person. However, the object of the machine learning is not limited to this and may be various objects in various fields such as manufacture, distribution, public service, transportation, medical care, education, or finance.

INDUSTRIAL APPLICABILITY

The method for generating a learned model, the learned model generating device, and the learned model use device according to the present disclosure are useful as the method for generating a learned model and the learned model generating device capable of generating the learned model after obtaining use consent from the sensing object and the learned model use device.

REFERENCE MARKS IN THE DRAWINGS

1 LEARNED MODEL PROVIDING SYSTEM
2 CONSENT ACQUISITION DEVICE
3 CAMERA
4 LEARNED MODEL GENERATING DEVICE
5 LEARNED MODEL PROVIDING DEVICE (SERVER DEVICE)
6 LEARNED MODEL USE DEVICE (USER SIDE DEVICE)
7 CAMERA
8 MEMBER DATABASE
9 PORTABLE TERMINAL
28 NEAR FIELD COMMUNICATOR
42 PROCESSOR

45 COMMUNICATOR
47 COMPENSATION DATABASE
52 PROCESSOR
55 COMMUNICATOR
57 LEARNED MODEL DATABASE
S VISITOR

The invention claimed is:

1. A method for generating a learned model by machine learning and to be performed using at least one processor based on sensing information acquired by sensing one or more sensing objects with one or more sensing devices, the method comprising:

by the processor,
acquiring, for at least one sensing object of the one or more sensing objects, use consent indicating consent for a use of the sensing information of the at least one sensing object for generating the learned model,
creating, in the sensing information of the one or more sensing objects, learning data by processing or deleting the sensing information of a sensing object of the one or more sensing objects other than the at least one sensing object for which the use consent is acquired, and
generating the learned model by machine learning using the learning data.

2. The method for generating a learned model of claim 1, wherein an electronic signature is attached to the generated learned model, the electronic signature indicating that processing or deleting the sensing information is performed on the sensing object for which use consent is not acquired when creating the learning data for the generated learned model.

3. The method for generating a learned model of claim 2, wherein when acquiring a notification that a verification result of the electronic signature given to the learned model is unverifiable from a learned model use device receiving the learned model, the processor performs invalidation processing on the learned model.

4. The method for generating a learned model of claim 1, wherein the one or more sensing objects comprise one or more persons and the sensing information comprises one or more face images of the one or more persons, and
wherein when creating the learning data,
in order to specify a non-consent face image of a person for which the use consent is not acquired, the processor acquires a consent face image of a person for which the use consent is acquired.

5. The method for generating a learned model of claim 4, wherein the consent face image is acquired by imaging a face of the person for which the use consent is acquired.

6. The method for generating a learned model of claim 4, wherein the consent face image is a face image of a person whose face image is stored in a portable terminal in advance acquired from the portable terminal possessed by the person for which the use consent is acquired through near field communication.

7. The method for generating a learned model of claim 4, wherein a unique identifier is given in advance to the person for which the use consent is acquired and the consent face image of the person is associated with the identifier and registered in a member database in advance, and
wherein the consent face image is acquired by searching the member database based on the identifier given to the person for which the use consent is acquired.

8. The method for generating a learned model of claim 1, wherein when acquiring a notification that the learned model is used from a learned model use device receiving the learned model, the processor gives a compensation value to an entity that provided the sensing information of the at least one sensing object for which the use consent is acquired or a business operator involved in generating the learned model.

9. The method for generating a learned model of claim 8, wherein the processor gives a unique identifier to the at least one sensing object for which the use consent is acquired, associates the identifier with the learned model generated by machine learning based on the sensing information of the at least one sensing object for which the use consent is acquired, and registers the identifier to a compensation database, and
wherein when acquiring a notification that the learned model is used from a learned model use device receiving the learned model, the processor searches the compensation database based on the identifier associated with the learned model to obtain the at least one sensing object for which the use consent is acquired when generating the learned model.

10. A learned model generating device that generates a learned model by machine learning based on sensing information obtained by sensing one or more sensing objects with one or more sensing devices, the learned model generating device comprising:

a communicator that performs communication between at least one processor and the one or more sensing devices,
wherein the at least one processor
acquires, for at least one sensing object of the one or more sensing objects, use consent indicating consent for a use of the sensing information of the at least one sensing object for generating the learned model, and
creates, in the sensing information of the one or more sensing objects, learning data by processing or deleting the sensing information of a sensing object of the one or more sensing objects other than the at least one sensing object for which the use consent is acquired.

11. A learned model generating device that generates a learned model by machine learning based on sensing information obtained by sensing one or more sensing objects with one or more sensing devices, wherein use consent is acquired from at least one sensing object of the one or more sensing objects, the use consent indicating consent for a use of the sensing information of the at least one sensing object for generating the learned model, the learned model generating device comprising:
a communicator that performs communication between at least one processor and the one or more sensing devices,
wherein the at least one processor
generates the learned model by machine learning using learning data created by processing or deleting the sensing information of a sensing object of the one or more sensing objects other than the at least one sensing object from which use consent for generating of the learned model is acquired.

12. The learned model generating device of claim 11, wherein an electronic signature is attached to the generated learned model, the electronic signature indicating that processing or deleting the sensing information is performed on the sensing object from which use consent is not acquired when creating the learning data for the generated learned model.

13. A learned model use device that uses the learned model provided from the learned model generating device of claim 12, the learned model use device comprising:
- at least one processor
- verifies the electronic signature given to the learned model, and
- in a case where a verification result of the electronic signature is acceptable, configures an analysis engine using the learned model to execute analysis processing.

* * * * *